US008135102B2

(12) United States Patent
Wiwel et al.

(10) Patent No.: US 8,135,102 B2
(45) Date of Patent: Mar. 13, 2012

(54) METHOD AND APPARATUS FOR DIGITALLY EQUALIZING A SIGNAL IN A DISTRIBUTED ANTENNA SYSTEM

(75) Inventors: Bernard K. Wiwel, Shoreview, MN (US); Jeffrey O. Brennan, Waseca, MN (US); Philip M. Wala, Savage, MN (US); Jeffrey J. Cannon, Victoria, MN (US); Dean Zavadsky, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 316 days.

(21) Appl. No.: 12/643,410

(22) Filed: Dec. 21, 2009

(65) Prior Publication Data

US 2010/0189170 A1    Jul. 29, 2010

Related U.S. Application Data

(60) Provisional application No. 61/147,560, filed on Jan. 27, 2009.

(51) Int. Cl.
*H04B 1/10* (2006.01)

(52) U.S. Cl. ...................................... 375/350

(58) Field of Classification Search .............. 375/229, 375/232, 350
See application file for complete search history.

(56) References Cited

U.S. PATENT DOCUMENTS

| 4,183,054 A | 1/1980 | Patisaul et al. |
| 4,611,323 A | 9/1986 | Hessenmiiller |
| 4,628,501 A | 12/1986 | Loscoe |
| 4,654,843 A | 3/1987 | Roza et al. |
| 4,691,292 A | 9/1987 | Rothweiler |
| 4,999,831 A | 3/1991 | Grace |
| 5,193,109 A | 3/1993 | Chien-Yeh Lee |
| 5,243,598 A | 9/1993 | Lee |
| 5,321,849 A | 6/1994 | Lemson |
| 5,339,184 A | 8/1994 | Tang |
| 6,134,282 A * | 10/2000 | Ben-Efraim et al. ......... 375/350 |

(Continued)

FOREIGN PATENT DOCUMENTS

EP    0391597    10/1990

(Continued)

OTHER PUBLICATIONS

Grace, Martin K., "Synchronous Quantized Subcarrier Multiplexing for Transport of Video, Voice and Data", "IEEE Journal on Selected Areas in Communications", Sep. 1990, pp. 1351-1358, vol. 8, No. 7, Publisher: IEEE.

(Continued)

*Primary Examiner* — Don N Vo
(74) *Attorney, Agent, or Firm* — Fogg & Powers LLC

(57) ABSTRACT

Systems and methods for digitally equalizing a signal in a distributed antenna system are provided. In one embodiment, a signal processing device within a distributed antenna system comprises a signal path within a signal processing board, the signal path having an uncompensated distortion function of $G(\omega)$ with a system response represented by $y(n)$; and a compensator coupled to the signal path, the compensator having a finite impulse response (FIR) filter with an impulse response function represented by $H(\omega)$, the compensator having an FIR filter parameter vector $\vec{h}$ determined from an estimated system response $y(n)$ of the signal path to an input comb signal $x(n)$, wherein $y(n)$ is estimated from interpolated measured output responses of the signal path to a plurality of frequency sweep signal test inputs.

20 Claims, 9 Drawing Sheets

U.S. PATENT DOCUMENTS

| | | | | |
|---|---|---|---|---|
| 6,313,703 | B1 * | 11/2001 | Wright et al. | 330/149 |
| 2005/0144650 | A1 * | 6/2005 | Tu et al. | 725/131 |
| 2006/0276156 | A1 | 12/2006 | Nakada et al. | |
| 2007/0135056 | A1 | 6/2007 | Kremer et al. | |
| 2007/0273567 | A1 * | 11/2007 | LaMarche | 341/144 |
| 2008/0242232 | A1 | 10/2008 | Zavadsky et al. | |
| 2008/0279318 | A1 | 11/2008 | Bharitkar et al. | |

FOREIGN PATENT DOCUMENTS

| | | |
|---|---|---|
| WO | 9115927 | 10/1991 |

OTHER PUBLICATIONS

Harvey et al., "Cordless Communications Utilising Radio Over Fibre Techniques for the Local Loop", "IEEE International Conference on Communications", Jun. 1991, pp. 1171-1175, Publisher: IEEE.

Hayes, Monson H., "Statistical Digital Signal Processing and Modeling", Mar. 28, 1996, pp. 166-174, Publisher: John Wiley & Sons, Inc.

International Searching Authority, "International Search Report", Jul. 22, 2010, Published in: WO.

\* cited by examiner

```
function [G,h,E]=inverseFIR4(Fm,Gm,C,M,N,n0)
% inverseFIR                                                                    700
%
% Calculates the least squares inverse FIR filter taps h that equalize
% the an approximation of the system amplitude response based on
% measured system gain response Gm of at the frequencies Fm.
%
% INPUT PARAMETERS
% Fm = column vector of frequency points of measured normalized gain response (MHz)
% Gm = column vector of measured normalized amplitude response
% C = number of tone in frequency comb test signal, M = sample length of frequency comb test signal
% N = length of inverse FIR filter, n0 = channel delay (must be less than M+N-1)
%
% OUTPUT PARAMETERS
% G = column vector of interpolated amplitude response
% h = column vector of inverse FIR filter impulse response, E = minimum squared error
% APPROXIMATE THE SYSTEM COMB RESPONSE
G=zeros(C,1);                                   % initialize amplitude response approximation
for k=0:(C-1);                                  % interpolate over 1st Nyquist zone
    w=k/(2*C);                                  % normalized frequency point to interpolate
    i=1;                                        % initialize measurement interval
    while w<Fm(i) | w>Fm(i+1)                   % find measurement interval to interpolate
        i=i+1;                                  % over
    end
    Ge=Gm(i)+(w-Fm(i))*(Gm(i+1)-Gm(i))/(Fm(i+1)-Fm(i));   % linearly interpolate amplitude
    G(k+1)=Ge;                                  % store interpolated point
end                                             % (note array index count starts at 1)
k=0:C-1;                                        % tone frequency index
n=-N+1:M+N-2;                                   % sample index
x=sum(cos(2*pi*k'*n/(2*C)));                    % comb input test signal
y=(G'*cos(2*pi*k'*n/(2*C)));                    % approximate the comb response of the system
% CALCULATE THE INVERSE FIR FILTER
d=x(N-n0:M+2*N-2-n0);                           % let the desired channel output be a delayed
                                                % frequency comb
Ycm=[];                                         % initialize convolution matrix of G
for i=0:N-1
    Ycm=[Ycm y(N-i:M+2*N-2-i)];                 % construct convolution matrix of G
end
h=Ycm\d;                                        % calculate least squares solution for FIR filter taps
h
% CALCULATE THE MINIMUM SQUARED ERROR
e=Ycm*h-d;                                      % calculate error vector in fit
E=e'*e;                                         % calculate the minimum squared error
```

FIG. 7

METHOD AND APPARATUS FOR DIGITALLY EQUALIZING A SIGNAL IN A DISTRIBUTED ANTENNA SYSTEM

CROSS-REFERENCE TO RELATED APPLICATIONS

This application claims the benefit of U.S. Provisional Application Ser. No. 61/147,560, entitled "METHOD AND APPARATUS FOR DIGITALLY EQUALIZING A SIGNAL IN A DISTRIBUTED ANTENNA SYSTEM" filed on Jan. 27, 2009, which is hereby incorporated herein by reference.

This application is related to U.S. patent application Ser. No. 11/627,251, entitled "MODULAR WIRELESS COMMUNICATIONS PLATFORM" filed on Jan. 25, 2007, which is hereby incorporated herein by reference.

BACKGROUND

A Distributed Antenna System (DAS) is a network of spatially separated antenna nodes connected to a common node via a transport medium that provides wireless service within a geographic area or structure. Common wireless communication system configurations employ a host unit as the common node, which is located at a centralized location (for example, at a facility that is controlled by a wireless service provider). The antenna nodes and related broadcasting and receiving equipment, located at a location that is remote from the host unit (for example, at a facility or site that is not controlled by the wireless service provider), are also referred to as "remote units." Radio frequency (RF) signals are communicated between the host unit and one or more remote units. In such a DAS, the host unit is typically communicatively coupled to one or more base stations (for example, via wired connection or via wireless connection) which allow bidirectional communications between wireless subscriber units within the DAS service area and communication networks such as, but not limited to, cellular phone networks, the public switch telephone network (PSTN) and the Internet. A DAS can thus provide, by its nature, an infrastructure within a community that can scatter remote units across a geographic area thus providing wireless services across that area.

A DAS having a digital transport for the downlink and uplink transport signals sent between the host unit and the remote units has many advantages over a DAS having an analog transport. Digitizing the downlink and uplink RF signals, however, may introduce unwanted effects into the RF signal.

SUMMARY

Systems and methods for digitally equalizing a signal in a distributed antenna system are provided. In one embodiment, a signal processing device within a distributed antenna system comprises a signal path within a signal processing board, the signal path having an uncompensated distortion function of $G(\omega)$ with a system response represented by $y(n)$; and a compensator coupled to the signal path, the compensator having a finite impulse response (FIR) filter with an impulse response function represented by $H(\omega)$, the compensator having an FIR filter parameter vector $\vec{h}$ determined from an estimated system response $y(n)$ of the signal path to an input comb signal $x(n)$, wherein $y(n)$ is estimated from interpolated measured output responses of the signal path to a plurality of frequency sweep signal test inputs.

DRAWINGS

Understanding that the drawings depict only exemplary embodiments of the present invention and are not therefore to be considered limiting in scope, the exemplary embodiments will be described with additional specificity and detail through the use of the accompanying drawings, in which.

Figure 8:
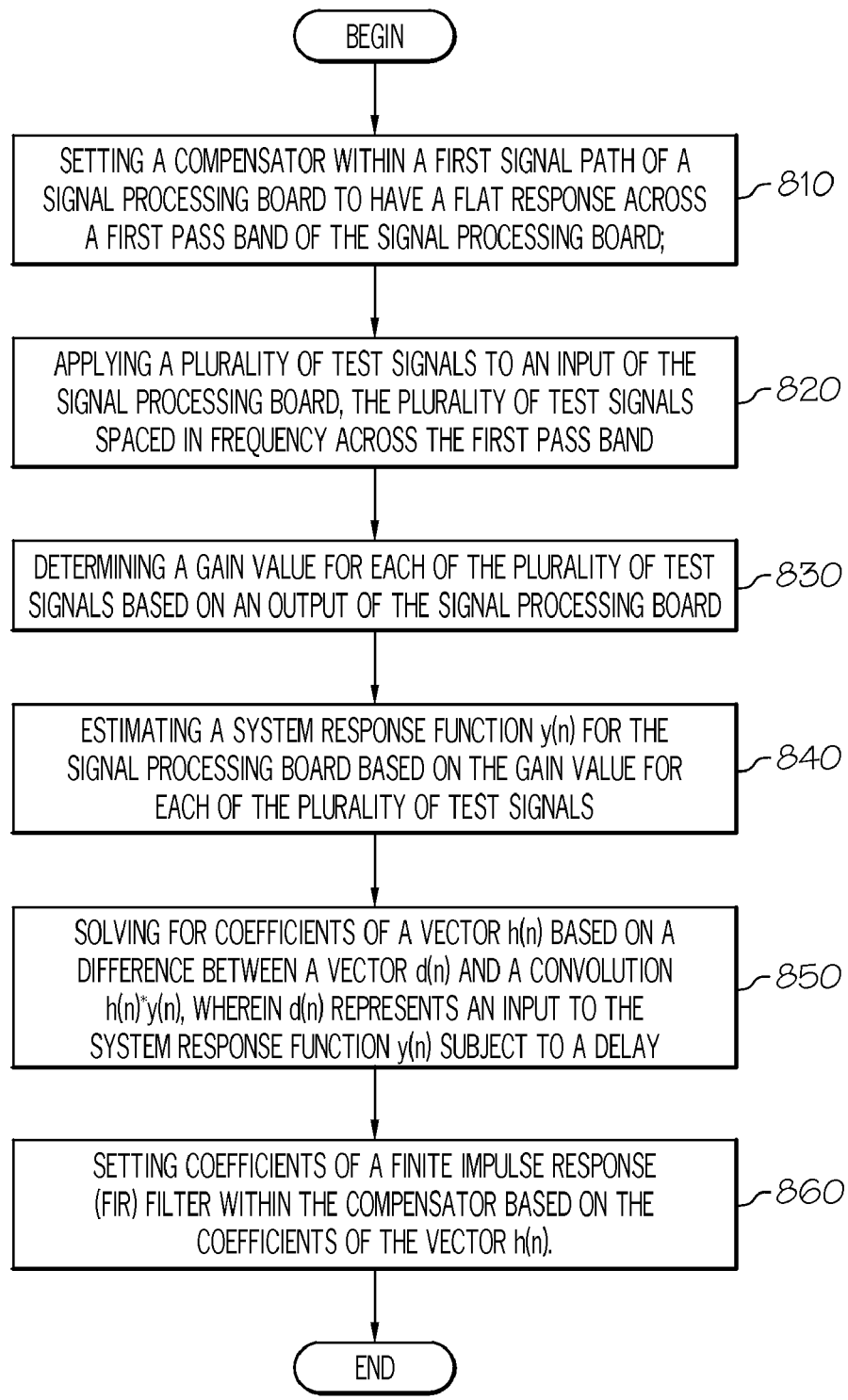

FIG. 7 provides a MATLAB code of one embodiment of the present invention; and FIG. 8 is a flow chart illustrating a method of one embodiment of the present invention for calibrating a signal processing board.

In accordance with common practice, the various described features are not drawn to scale but are drawn to emphasize specific features relevant to the exemplary embodiments of the present invention.

DETAILED DESCRIPTION

The present disclosure is directed towards a method and apparatus for equalizing an RF signal when the transmitted RF signal is converted between a stream of digitized RF samples and an analog RF signal. The RF signal is equalized to smooth a frequency response of the RF signal. In other words, RF signals on a given frequency within a band are made similar in power to RF signals on other frequencies within the band, in order to achieve (ideally) a flat response across the frequency band. In one embodiment, the RF signal is digitally equalized with a finite impulse response (FIR) filter.

Figure 1:
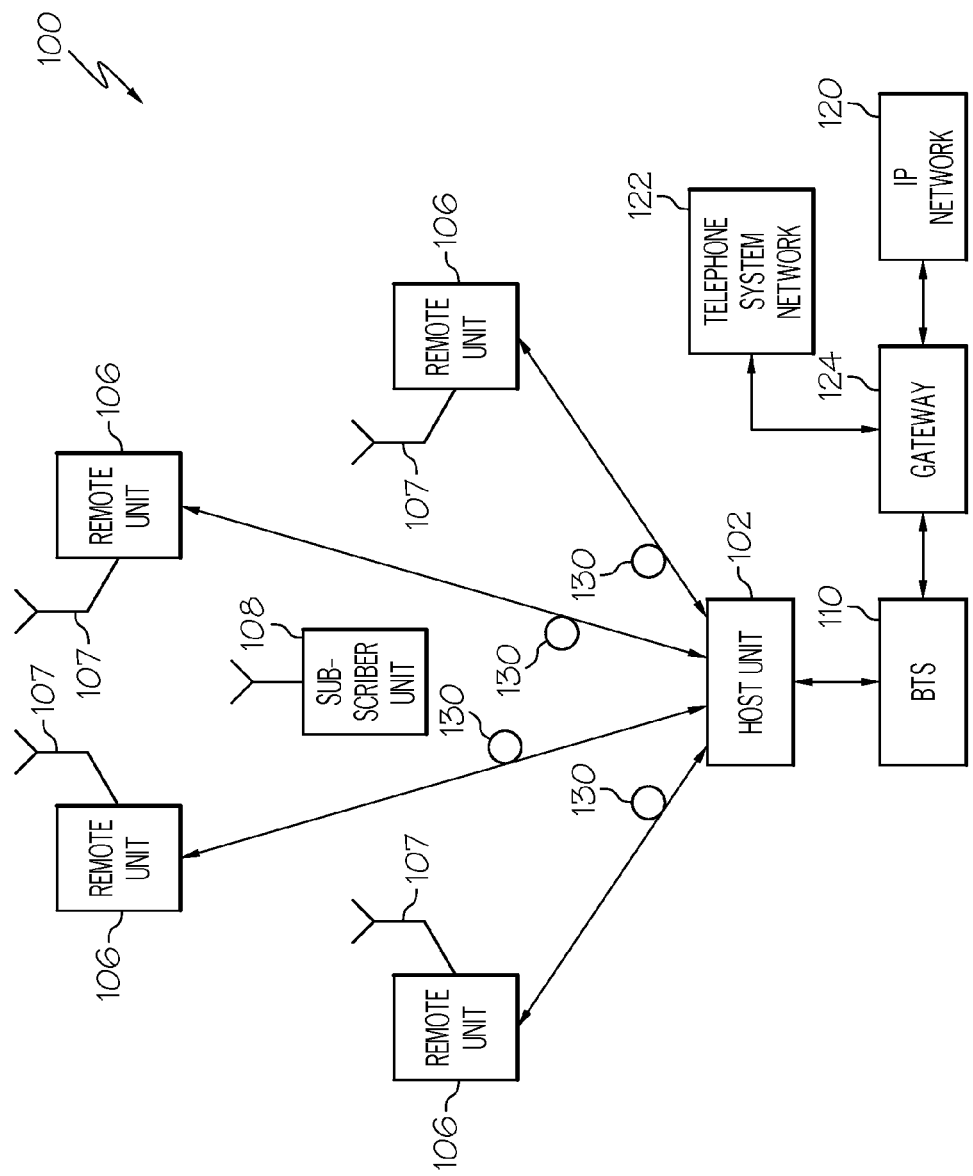
FIG. 1 is a block diagram of one embodiment of a distributed antenna system (DAS) including a host unit and a plurality of remote units.

FIG. 1 is a block diagram of one embodiment of a distributed antenna system (DAS) 100. DAS 100 includes a host unit 102 and a plurality of remote units 106. At the physical layer, host units 102 and remote units 106 are communicatively coupled via a communication link 130 to form a bidirectional communication network comprising a plurality of point-to-point communication links 130. In one embodiment, one or more of communication links 130 are fiber optic cable as indicated in FIG. 1. Optionally, host units 102 and remote units 106 may be interconnected via coaxial cable, or a combination of both coaxial cable and fiber optic cable. Additionally, in other embodiments, one or more of communication links 130 are wireless millimeter wave links (e.g. E Band/70 GHz radio). Here a millimeter signal transceiver is coupled to host unit 102 and each remote unit 106 on each end of communication link 130. In yet another embodiment, one or more of communication links 130 a microwave radio links where microwave radio transceivers are coupled to host unit 102 and remote units 106.

Remote units 106 each house electronic devices and systems used for wirelessly transmitting and receiving modulated radio frequency (RF) communications via antenna 107 with one or more mobile subscriber units 108. Host unit 102 is coupled to at least one base transceiver station (BTS) 110 often referred to as a base station. BTS 110 communicates voice and other data signals between the respective host unit 102 and a larger communication network via a gateway 124 coupled to a telephone system network 122 (for example, the public switched telephone network and/or wireless service provider networks) and an internet protocol (IP) network 120, such as the Internet. In one embodiment, DAS 100 comprises part of a cellular telephone network and subscriber units 108 are cellular telephones.

Downlink RF signals are received from the BTS 110 at the host unit 102, which the host unit 102 uses to generate one or more downlink transport signals for transmitting to one or more of the remote units 106. Each such remote unit 106 receives at least one downlink transport and reconstructs the downlink RF signals from the downlink transport signal and causes the reconstructed downlink RF signals to be radiated from a remote antenna 107 coupled to or included in that remote unit 106. A similar process is performed in the uplink direction. Uplink RF signals received at one or more remote units 106 from subscriber 108 are used to generate respective uplink transport signals that are transmitted from the respective remote units 106 to the host unit 102. The host unit 102 receives and combines the uplink transport signals transmitted from the multiple remote units 106. The host unit 102 communicates the combined uplink RF signals to the BTS 110 over a broadband signal.

DAS 100 comprises a digital DAS transport meaning that the downlink and uplink transport signals transmitted between host unit 102 and remote units 106 over communication links 130 are generated by digitizing the downlink and uplink RF signals, respectively. In other words, the downlink and uplink transport signals are not analog RF signals but instead are digital data signals representing digital RF samples of a modulated RF signal. For example, if a particular communication signal destined for transmission to subscriber unit 108 is a modulated RF signal in the 900 MHz band, then host unit 102 will generate baseband digital samples of the modulated 900 MHz RF signal from BTS 110, which are then distributed by host unit 102 to the remote units 106. Alternatively, an all-digital BTS may generate baseband digital samples directly. At the remote units, the digital samples of the modulated RF signal are converted from digital into an analog RF signal to be wirelessly radiated from the antennas 107. In the uplink analog RF signals received at remote unit 106 are digitally sampled to generate digital RF data samples for the uplink transport signals. BTS 110, host unit 102 and remote units 106 each accommodate processing communication signals for multiple bands and multiple modulate schemes simultaneously.

Figure 2:
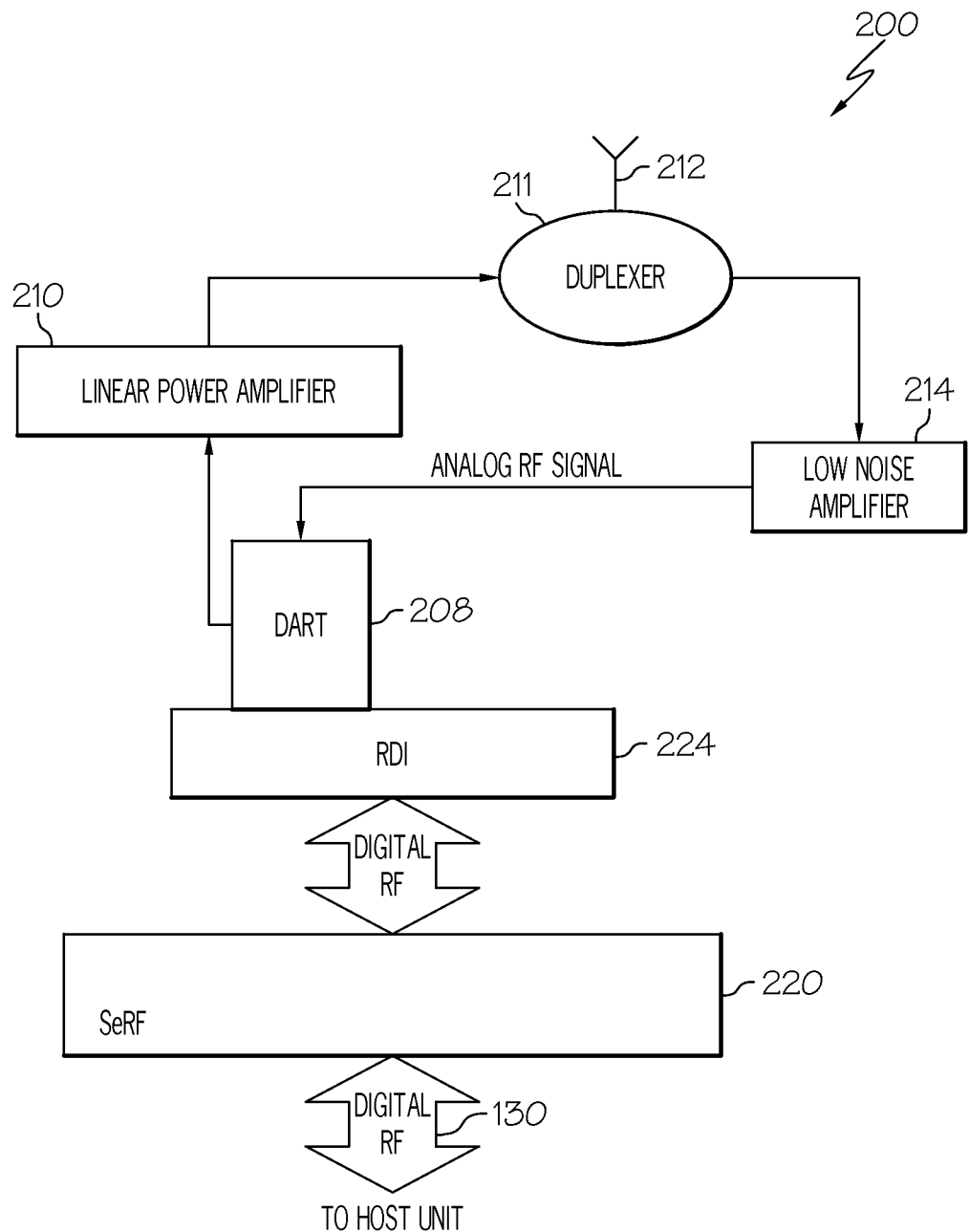
FIG. 2 is a block diagram of one embodiment of a remote unit of FIG. 1.

FIG. 2 is a block diagram of one embodiment of a remote unit 106. Remote unit 106 includes a serial radio frequency (SeRF) module 220, a digital to analog radio frequency transceiver (DART) module 208, a remote DART interface board (RDI) 224, a linear power amplifier 210, antenna 212, a duplexer 211, a low noise amplifier 214. In one embodiment, SeRF modules and DART modules described herein are realized using FPGAs, ASICs, digital signal processing (DSP) boards, or similar devices.

DART module 208 provides bi-directional conversion between analog RF signals and digital sampled RF for the downlink and uplink transport signals transmitted between host unit 102 and remote units 106. In the uplink, antenna 212 receives a wireless RF signal from subscriber 208 and passes the RF signal to DART module 208 via low noise amplifier 214. DART module 208 receives the incoming analog RF signal and samples the analog RF signal to generate a digital data signal for use by SeRF module 220. In the downlink, DART module 208 receives digital sampled RF data from SeRF module 220, up converts the sampled RF data to a broadcast frequency, and converts the digital RF samples to analog RF for wireless transmission. After a signal is converted to an analog RF signal by DART module 208, the analog RF signal is sent to power amplifier 210 for broadcast via antenna 212. Power amplifier 210 amplifies the RF signal received from DART module 208 for output through duplexer 211 to antenna 212. Duplexer 211 provides duplexing of the signal which is necessary to connect transmit and receive signals to a common antenna 212. In one embodiment, low noise amplifier 214 is integrated into duplexer 211. One of ordinary skill in the art upon reading this specification would appreciate that DART modules may function to optionally convert the digital RF samples into intermediate frequency (IF) samples instead of, or in addition to, baseband digital samples.

DART modules in a remote unit are specific for a particular frequency band. A single DART module operates over a defined FDD band regardless of the modulation technology being used. Thus frequency band adjustments in a remote unit can be made by replacing a DART module covering one frequency band with a DART module covering a different frequency band. For example, in one implementation DART module 208 is designed to transmit 850 MHz cellular transmissions. As another example, in another implementation DART module 208 transmits 1900 MHz PCS signals. Some of the other options for a DART module 208 include Nextel 800 band, Nextel 900 band, PCS full band, PCS half band, BRS, WiMax, Long Term Evolution (LTE), and the European GSM 900, GSM 1800, and UMTS 2100. By allowing different varieties of DART modules 208 to be plugged into RDI 224, remote unit 106 is configurable to any of the above frequency bands and technologies as well as any new technologies or frequency bands that are developed.

SeRF module 220 provides bi-directional conversion between a digital data stream and a high speed optical serial data stream. In the uplink, SeRF module 220 receives incoming digital data streams from DART module 208 and sends a serial optical data stream over communication link 130 to host unit 102. In the downlink, SeRF module 202 receives an optical serial data stream from host unit 102 and provides a digital data stream to DART module 208.

SeRF module 220 is coupled to RDI 224. RDI 224 has a plurality of connectors each of which is configured to receive a pluggable DART module 208 and couple DART module 208 to SeRF module 220. RDI 224 is a common interface that is configured to allow communication between SeRF module 220 and different varieties of DART modules 208. In this embodiment, RDI 204 is a passive host backplane to which SeRF module 220 also connects. In another embodiment, instead of being a host backplane, RDI 224 is integrated with SeRF module 220.

Although FIG. 2 illustrates a single DART module coupled to a SeRF module, a single remote unit housing may operate over multiple bands by possessing multiple DART modules. In one such embodiment, RDI 224 provides separate connection interfaces allowing each DART module to communicate RF data samples with SeRF module 220. Here, SeRF module 220 allows multiple DART modules to operate in parallel to communicate high speed optical serial data streams over a communication link with the host unit. In one such embodiment a SeRF module actively multiplexes the signals from multiple DART modules (each DART module processing a different RF band) such that they are sent simultaneously over a single transport communication link. In one embodiment a SeRF module presents a clock signal to each DART module to which it is coupled to ensure synchronization.

Furthermore, although FIG. 2 illustrates a single SeRF module connected to a single RDI, embodiments of the present invention are not limited as such. In alternate embodiments, a SeRF module may connect to multiple RDIs, each of which can connect to multiple DARTS. For example, in one embodiment, a SeRF module can connect to up to 3 RDIs, each of which can connect to up to 2 DARTs. SeRF module 220 provides bi-directional conversion between a serial stream of RF, IF or baseband data samples (a SeRF stream) and a high speed optical serial data stream. In the uplink direction, SeRF module 220 receives an incoming SeRF stream from DART modules 208 and sends a serial optical data stream over communication links 130 to host unit 102. In the downlink direction, SeRF module 220 receives an optical serial data stream from host unit 102 and provides a SeRF stream to DART modules 208. The present discussion applies to such multiple band remote units, even though the present examples focus on the operation of a single DART module for simplicity.

Figure 3:
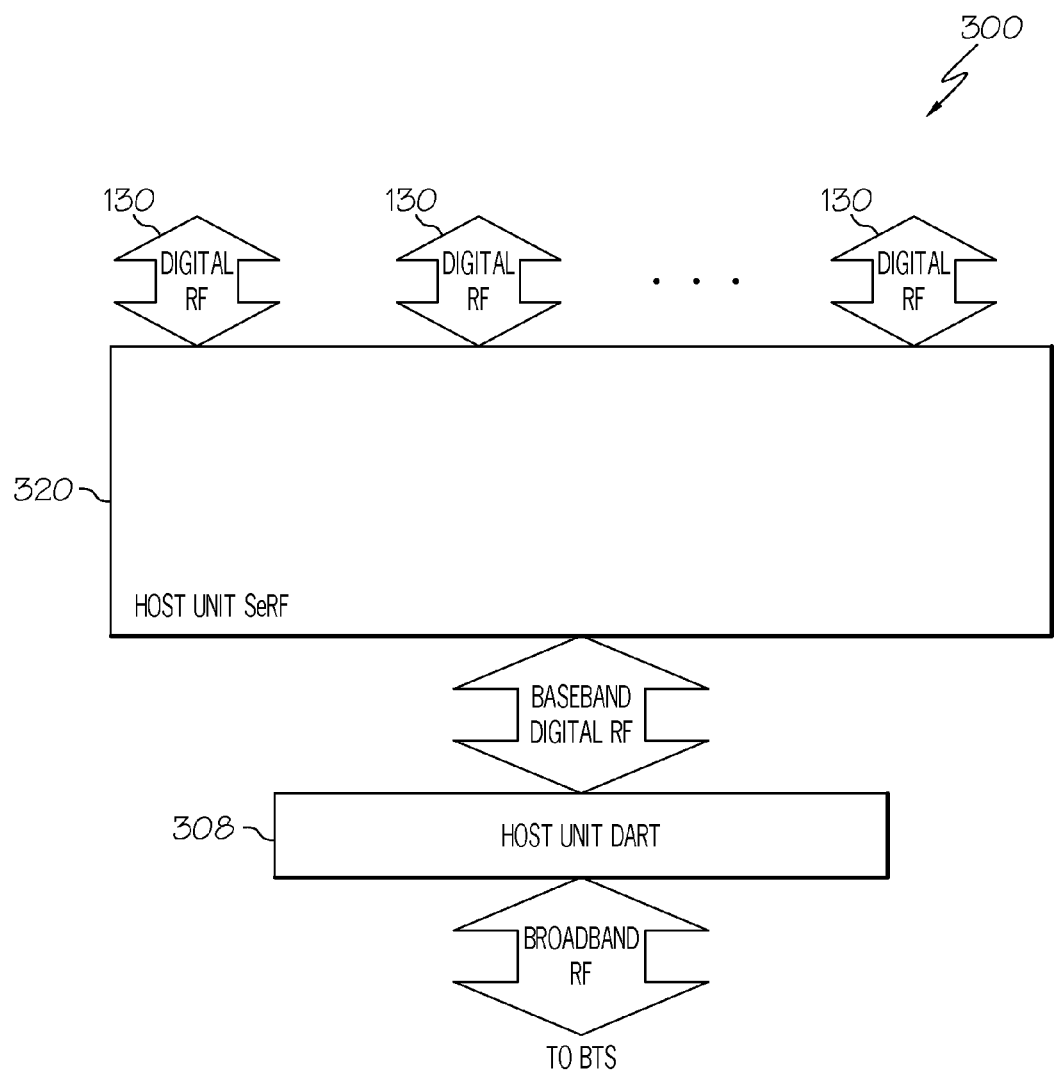
FIG. 3 is a block diagram of one embodiment of a host unit of FIG. 1

FIG. 3 is a block diagram illustrating one embodiment of a host unit (shown generally at 102). Host unit 102 is communicatively coupled to multiple remote units 106 via communication links 130, as described with respect to FIG. 1, to form a digital DAS. Host unit 102 includes a host unit digital to analog radio frequency transceiver (DART) module 308 and a host unit serial radio frequency (SeRF) module 320. SeRF module 320 provides bi-directional conversion between a digital RF data samples and the multiple high speed optical serial data streams to and from the remote units 106. In the uplink direction, SeRF module 320 receives incoming serial optical data streams from a plurality of remote units and converts each into a stream of digitized baseband RF data samples, which are summed into a broadband stream of RF data samples. DART module 308 provides a bi-directional interface between SeRF module 320 and one or more base stations, such as BTS 110. As with remote units 106, when host unit 320 operates over multiple bands with multiple base stations, a separate DART module 308 is provided for each frequency band.

Figure 4:
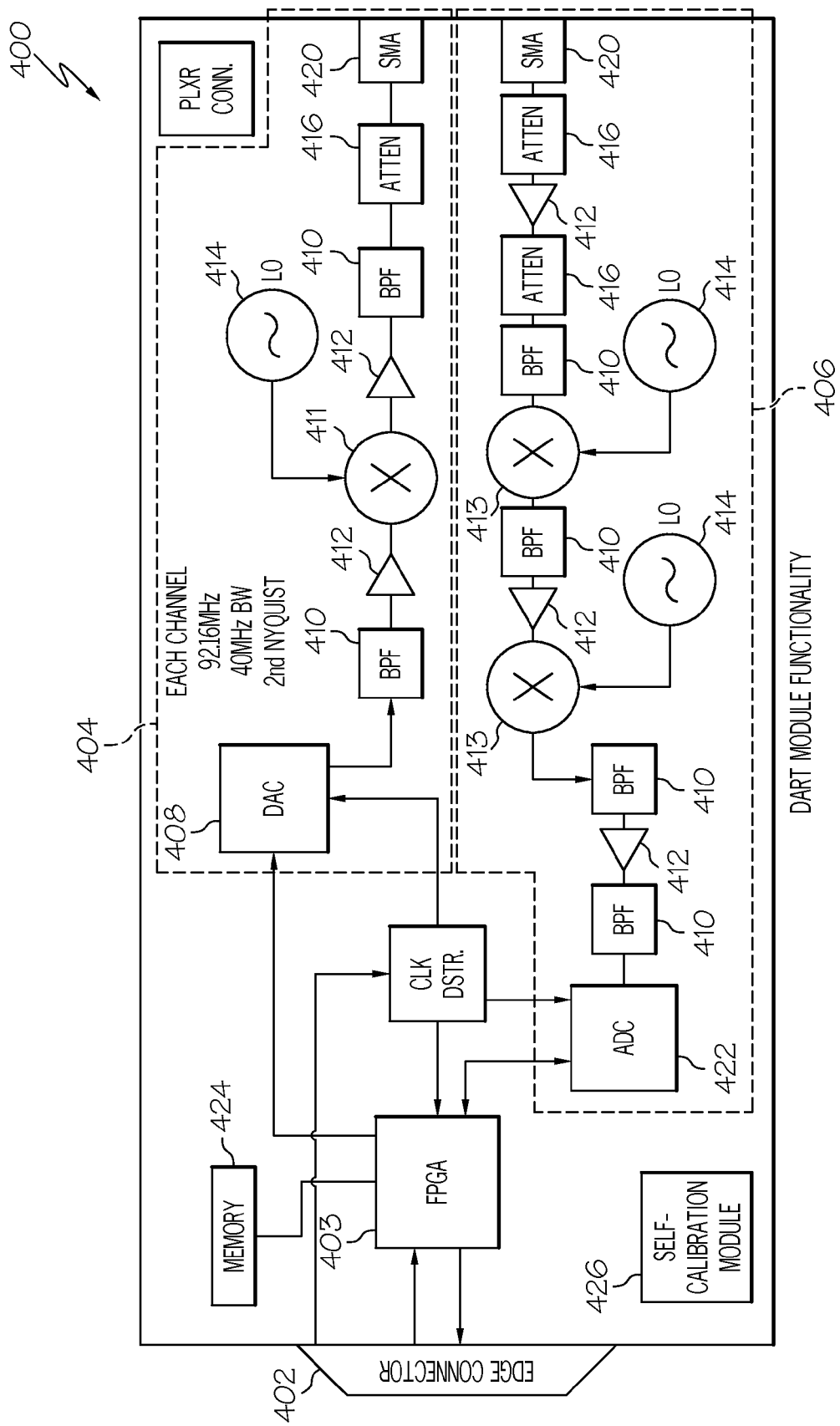
FIG. 4 illustrates a schematic view of one embodiment of a DART module for using in either the host unit of FIG. 2 or the remote unit of FIG. 3.

FIG. 4 is a block diagram of one embodiment of a DART module 400 for use in either host unit 102 (DART module 308) or remote units 106 (DART module 208). DART module 400 has two main signal paths; a transmission path 404 and a reception path 406. For signals received from a SeRF module, DART module 400 forms parallel digital RF data from the incoming data stream, if needed, at FPGA 403. In this embodiment, FPGA 403 is a logic device that is programmed to convert serial digital data into RF sampled data and programmed to convert RF sampled data into serial digital data. DART module 400 then converts the digital RF data to an analog signal with digital to analog converter (DAC) 408. Transmission path 404 continues as DART module 400 filters, amplifies and up-converts the analog signal for RF transmission with an assortment of filters 410, amplifiers 412, an oscillator 414, and an attenuator 416. The transmission path exits DART module 400 at a subminiature version A RF coaxial connector (SMA) connector 420. The signals travel in the opposite direction down reception path 406, where they are converted from analog to digital and sent to a SeRF module. First signals are received at SMA connector 420. DART module 400 then amplifies, down-converts, filters the incoming RF signal with a plurality of filters 410, amplifiers 412, oscillators 414, and attenuators 416. DART module 400 then digitizes the signal with analog to digital converter 422. FPGA 403 then provides the data stream as parallel digital RF sampled data to a SeRF module. More detail regarding DAS 100, host unit 102, remote units 106, or DART modules 400 is provided in co-pending U.S. application Ser. No. 11/627,251 which is hereby incorporated herein by reference.

Along with converting between serial digital data and RF sampled data, FPGA 403 also digitally equalizes the signals propagating through DART module 400 by applying a filter to transmission and receive signals. In one embodiment, a finite impulse response (FIR) filter is used, and the FIR filter response is set to closely resemble an inverse frequency response of DART module 400. The FIR filter therefore compensates for signal distortion caused by the DART module 400. In one embodiment, FPGA 403 applies a filter to both the transmission and the reception signals within DART module 400. Transmission signals are pre-compensated for by applying a filter to compensate for distortion caused by DAC 408, band pass filters (BPF) 410, amplifiers 412 and up-converter 411. Reception signals are post-compensated for by applying a filter to compensate for distortion cause by BPFs 410, amplifiers 412, and down-converters 413. In one embodiment, the filters attempt to set transmission and reception signals to unity gain across the frequency band covered by DART module 400. In one embodiment, the filter equalizes across a 35 MHz band of signals.

As explained above with respect to FIG. 1, DAS 100 comprises multiple pluggable and removable DART modules 400. Each DART module 400 is individually equalized to compensate for distortion caused by that particular DART module 400. This enables any DART module 400 to be placed in a signal path with any other DART module 400 while providing adequate equalization to the signal path. Since a given signal path through DAS 100 travels through two DART modules 400 (one in the remote unit 106 and one in the host unit 102), and since the particular DART modules 400 that operate together on the given signal path are unknown prior to installation of DAS 100, it is difficult to compensate for the specific distortion in the specific signal path prior to installation. Thus, individually equalizing the DART modules 400 enables the DART modules to be equalized prior to installation. Furthermore, this enables DART modules 400 to be plugged in any location, or replaced by any other DART module 400 while adequate equalization to the signal path. Additionally, individually equalizing DART modules 400 enables multicasting/simulcasting within DAS 100. Accordingly, within a given DAS signal path, a portion of the equalizing is done at host unit DART module 208 and another portion is done at remote unit DART module 308. This is true of both uplink and downlink signals.

Figure 5A:
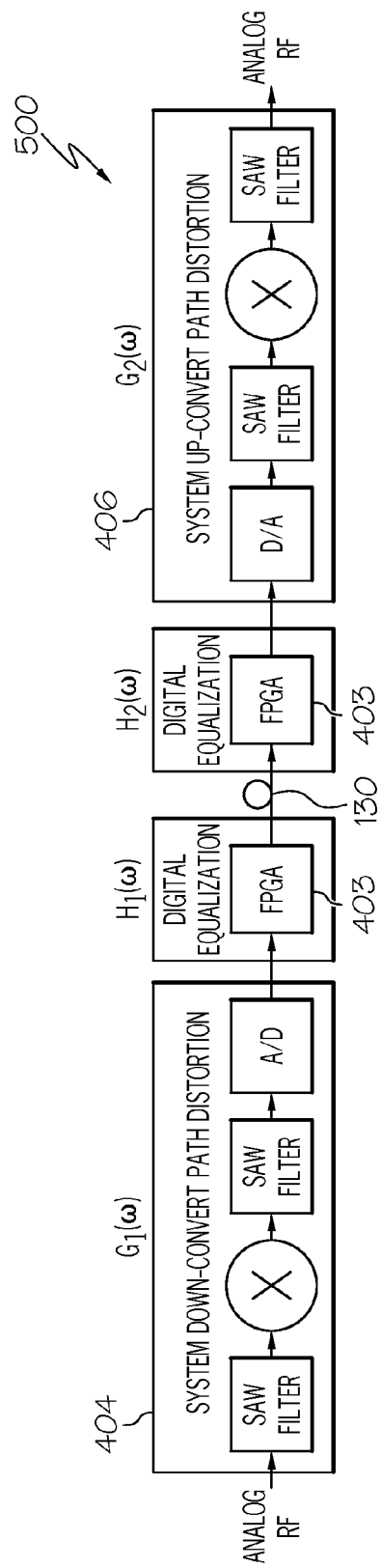
FIG. 5A is a block diagram illustrating distortion in a signal path through the DAS shown in FIG. 1.

FIG. 5A illustrates one embodiment of a RF signal path 500 through DAS 100. An analog RF signal 502 is input into signal path 500. The analog RF signal is filtered with a surface acoustic wave (SAW) filter (BPF 410 of FIG. 4), down-converted (down-converters 413 of FIG. 4), and filtered again before being converted to digital RF samples. This occurs in receive path 406 of a DART module 400. Each of these steps, however, may introduce distortion (referred to herein as $G1(\omega)$) into the RF signal. The signal is then transported via communication link 130 where the signal is converted to analog, SAW filtered, up-converted (up-converter 411 of FIG. 4), and SAW filtered again. These steps occur in transmission path 404 of another DART module 400 and also may introduce distortion (referred to herein as $G2(\omega)$ distortion) into the RF signal.

The distortion in each DART module 400 is equalized by FPGA 403 in each DART module 400. Each FPGA 403 in each DART module 400 applies a filter (referred to herein as H(ω)) to the signal. Thus, G1(ω) distortion is compensated for by the H1(ω) filter and G2(ω) distortion is compensated for by the H2(ω) filter.

Figure 5B:
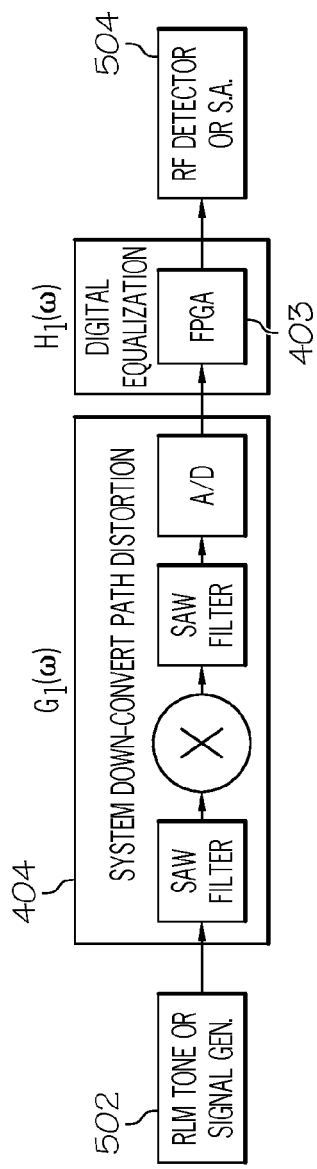
FIG. 5B is a block diagram illustrating a test system for a receiving path of the DART module shown in FIG. 4.
Figure 5C:
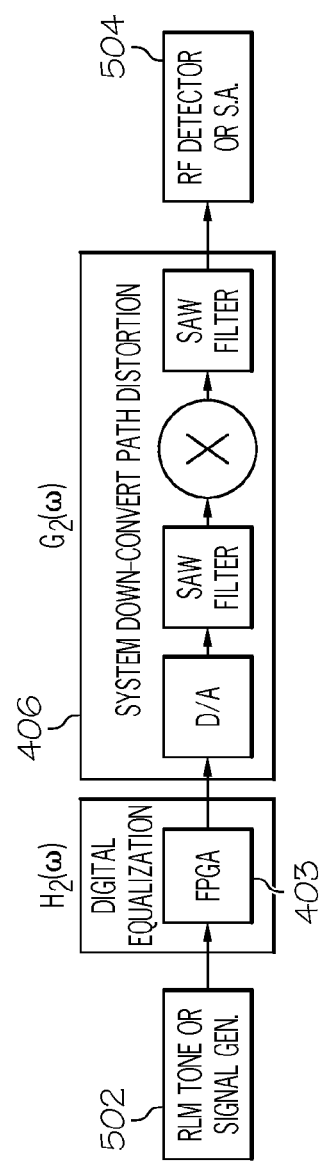
FIG. 5C is a block diagram illustrating a test system for a transmission path of the DART module shown in FIG. 4.

FIG. 5B illustrates one method for determining the filter coefficients for a receive path filter (H1(ω)). Likewise, 5C illustrates one method for determining the filter coefficients for a transmission path filter (H2(ω)). To determine coefficients for the filters, test signals are input into the DART module and output signals are measured to determine the distortion caused by the DART module. Based on the measured output signals filter coefficients are determined. The filter coefficients are then set such that the filter applies the inverse of the distortion introduced by the DART module.

an SMA connector 420. For determining H2(ω), a digitized signal is applied to the transmit path at the edge connector 402 and the resulting analog RF output signal measured at the SMA connector 420 with an RF spectrum analyzer or RF detector to determine the signal amplitude. In other embodiments, the output signals are measured with an RF detector. In one embodiment, the digitized signal is generated within the FPGA 403 rather than applied from an external device. The input test signals for determining H1(ω) and H2(ω) are referred to as frequency sweep signals.

Table 1 provides an arrangement of parameters for measured amplitude response of a component of a distributed antenna system such as a DART module.

TABLE 1

| Parameter | Symbol | Value |
| --- | --- | --- |
| Start of pass band | Fa | Given normalized start frequency of pass band. (units of samples) |
| End of pass band | Fb | Given normalized end frequency of pass band. (units of samples) |
| Pass band width | bw | bw = Fb − Fa |
| Number of measured data points | K | Given, K = 11 for example |
| Frequency points of measurement | Fm | $Fm(n) = \begin{cases} 0 & \text{for } n = 0 \\ Fa + (n-1)\frac{bw}{K-1} & \text{for } 1 \leq n \leq K \\ 0.5 & \text{for } n = K+1 \end{cases}$ |
| Measured gain values | Gm | $Gm(n) = \begin{cases} 0 & \text{for } n = 0 \\ \text{measured gain value at } Fm(n) & \text{for } 1 \leq n \leq K \\ 0 & \text{for } n = K+1 \end{cases}$ |

For example, to determine the H1(ω) filter coefficients for a DART module 400, a frequency sweep test signal from a signal generator 502 is applied to receive path 404 of a DART module 400. The test signals can be generated with any suitable signal generator. For the initial test sequence, FPGA 403 applies a flat filter response. The output signal at edge connector 402 of DART module 400 that results from the test signal is then measured with a spectrum analyzer 504. For determining H1(ω) an analog RF test signal is applied to the receive path 404 and a digitized signal output at the edge connector 402 is analyzed using a spectral estimation algorithm to determine the amplitude response of the system. The input test signals are all input with equal amplitude, thus variations in the amplitude of output signals are the result of distortion in receive path 404 of DART module 400. The filter coefficients are then set such that the filter cancels out the distortion caused by receive path 404 in DART module 400. Thus, future signals input into receive path 404 will be distorted by receive path 404 and equalized by FPGA 403 such that the output signals will (ideally) have the same relative amplitude (amplitude relative to other output signals) as the amplitude of input signals relative to other input signals. The H2(ω) filter coefficients for DART module 400 are determined in a similar manner except test signals are input into the edge connector 402 of DART module 400 and the resulting output signals are measured with a spectrum analyzer 504 at An approximation of the overall response by linearly interpolating the measured data is represented with the following equation:

$$Ge(\omega) = Gm(n) + (\omega - Fm(n))\frac{Gm(n+1) - Gm(n)}{Fm(n+1) - Fm(n)} \quad (1)$$

for $0 \leq Fm(n) \leq \omega \leq Fm(n+1) \leq 0.5$

With the assumption that the system phase response is roughly constant, a frequency comb test signal consisting of a series of sinusoids of equal amplitude spaced evenly across the digital spectrum will allow determination of an inverse FIR filter to equalize the amplitude response of the system. Table 2 describes the relationship between a frequency comb signal x(n) and an approximation y(n) of a system response output. The frequency comb signal x(n) is applied to a model of the system described by the approximation of the overall system response Ge(ω), which is based on an interpolation of the K measurements of the amplitude made with the frequency sweep signal. The purpose of the frequency comb is merely for calculation and consists of C tones which, in general, can be greater than the number K. In one embodiment, frequency comb signal x(n) is generated and resides within a computer used to calculate estimates of an H(ω) which could be H1(ω) or H2(ω).

TABLE 2

Input and output frequency comb test signals.

| Parameter | Symbol | Value |
|---|---|---|
| Number of tones | C | Given, C = 128 in example |
| System gain response | G | $G(m) = Ge\left(\frac{m}{2C}\right)$ for $0 \leq m \leq C - 1$ |
| Length of test signals | M | Given, M = 16C in example |
| Input comb signal | x | $x(n) = \sum_{k=0}^{C-1} \cos\left(2\pi \frac{k \cdot n}{2C}\right)$ for $-N + 1 \leq n \leq M + N - 2$ |
| Output comb signal | y | $y(n) = \sum_{k=0}^{C-1} G(m) \cdot \cos\left(2\pi \frac{k \cdot n}{2C}\right)$ for $-N + 1 \leq n \leq M + N - 2$ |

Figure 6:
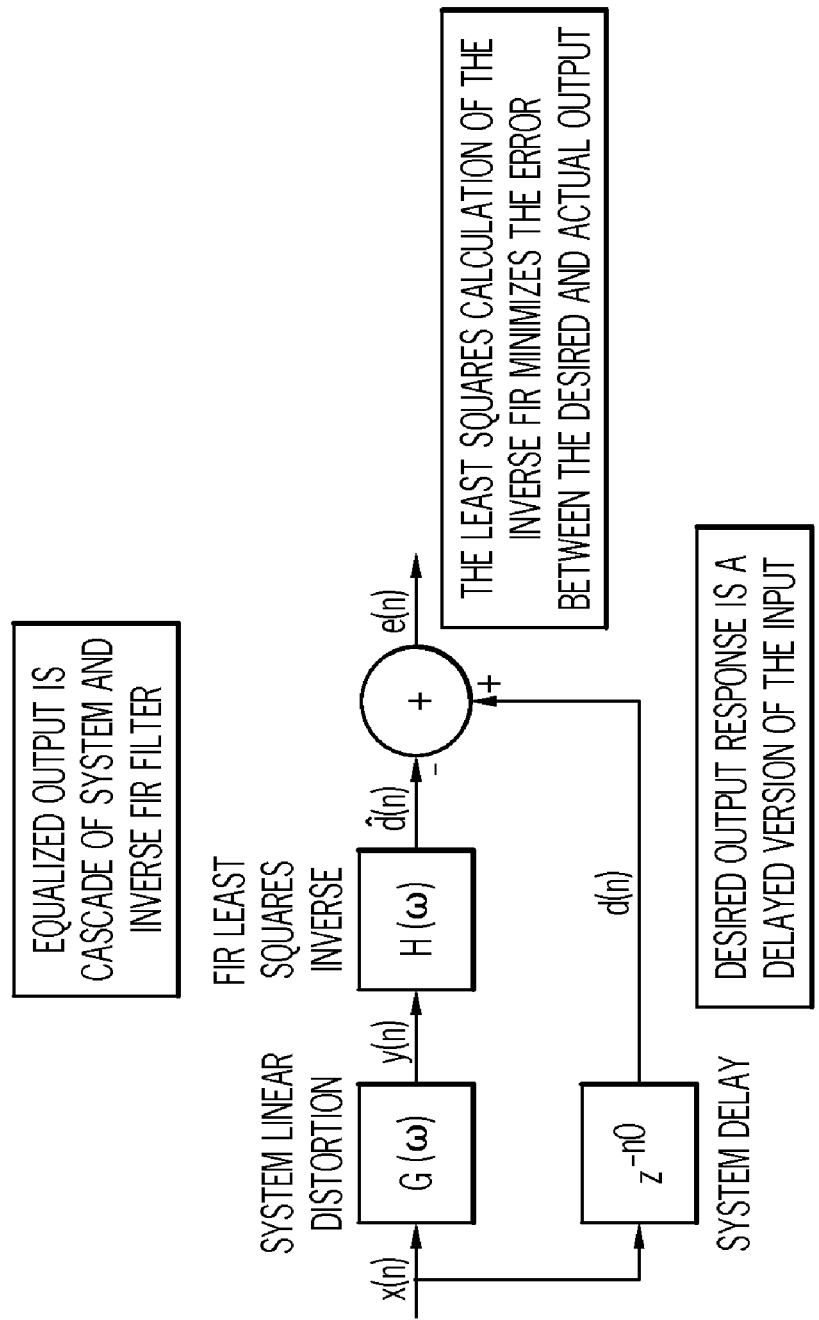
FIG. 6 is a block diagram of a method of determining a filter response.

FIG. 6 illustrates a signal model (shown generally at 600) for determining an FIR filter $H(\omega)$ that estimates the inverse of a linear channel response. Determination of the FIR filter $H(\omega)$ is based on a least squares fit and will find the parameters of an FIR filter that will equalize a channel $G(\omega)$ that has linear distortion. In FIG. 6, d(n) represents the desired system response, which in one embodiment, is a delayed version of the input. $\hat{d}(n)$ is the equalized system response resulting from the cascade of the channel distortion $G(\omega)$ and the approximated system inverse filter $H(\omega)$.

The least squares calculation of $H(\omega)$ minimizes the square of the error e(n) between the desired and equalized responses. Additional information on the least squares fit method illustrated in FIG. 6 is provided in Monson H. Hayes, Statistical Digital Signal Processing and Modeling (New York, Chichester, Brisbane, Toronto, Singapore: John Wiley & Sons, 1996), 166.

Given an N tap FIR filter for $H(\omega)$ the error term e(n) can be expressed in terms of the channel output y(n) and the desired channel output d(n) as $$e(n) = d(n) - h(n) * y(n) = d(n) - \sum_{l=0}^{N-1} h(l) y(n-l) \quad (2)$$

where h(n)*y(n) is the convolution operation. Taking M consecutive samples of y(n) and d(n), and setting e(n)=0, equation (2) can be expressed in matrix form as a set of M+N−1 over determined linear equations:

$$\begin{bmatrix} y(0) & y(-1) & y(-2) & \cdots & y(-N+1) \\ y(1) & y(0) & \vdots & & \vdots \\ y(2) & y(1) & y(0) & & \vdots \\ \vdots & y(2) & y(1) & \ddots & \vdots \\ y(M-1) & \vdots & y(2) & \ddots & y(0) \\ \vdots & y(M-1) & \vdots & \ddots & y(1) \\ \vdots & \vdots & y(M-1) & & y(2) \\ \vdots & \vdots & \vdots & \ddots & \vdots \\ y(M+N-2) & y(M+N-3) & y(M+N-4) & \cdots & y(M-1) \end{bmatrix} \quad (3)$$

-continued $$\begin{bmatrix} h(0) \\ h(1) \\ h(2) \\ \vdots \\ h(N-1) \end{bmatrix} = \begin{bmatrix} d(0) \\ d(1) \\ d(2) \\ \vdots \\ d(M+N-2) \end{bmatrix}$$

or more concisely as $$\vec{Y}\vec{h} = \vec{d} \quad (4)$$

where $\vec{Y}$ is the convolution matrix of the channel output samples, $\vec{h}$ is the vector of FIR filter parameters (the unit pulse response of the FIR filter), and $\vec{d}$ is a vector of the desired channel output samples (a delayed version of the input). An optimal solution to equation can be found using the least squares method which minimizes the sum of the square of the error terms e(n). The least squares solution is found by solving the set of linear equations $$(\vec{Y}^H \vec{Y}) \vec{h} = \vec{Y}^H \vec{d} \quad (5)$$

or $$\vec{h} = (\vec{Y}^H \vec{Y})^{-1} \vec{Y}^H \vec{d} \quad (6)$$

FIG. 7 provides a MATLAB code generally at 700 that can be used to perform the least squares estimate of the inverse filter. Table 3 below summarizes the calculation used therein for deriving the inverse FIR filter.

TABLE 3

| Parameter | Symbol | Value |
|---|---|---|
| Number of FIR Taps | N | Given, N = 11 for example |
| Channel delay | n0 | Given, n0 = 5 for example |
| Desired channel output | d | d(n) = x(n − n0) for $0 \leq n \leq M + N - 2$ |
| Convolution matrix of the system impulse response | Ycm | $Ycm(r, c) = \vec{Y}_{r, c}$ for $1 \leq r \leq N + M - 1$ and $1 \leq c \leq N$ (see equations (3)-(6) above) |
| Inverse FIR filter taps | h | $h(n) = \vec{h}_{n+1}$ for $0 \leq n \leq N - 1$ (see equations (3)-(6) above) |
| Squared error | E | $E = (\vec{Y}\vec{h} - d)^H \cdot (\vec{Y}\vec{h} - d)$ |

The inverse channel error response of the system (i.e., a DART module) will thus be $E=(\vec{Y}\vec{h}-d)^{H} \cdot (\vec{Y}\vec{h}-d)$ for the derived FIR filter $H(\omega)$ having coefficients represented by $h(n)=\vec{h}_{n+1}$ for $0 \leq n \leq N-1$.

In one embodiment, the filter coefficients are stored in a memory 424 on DART module 400. Once the coefficients are determined as described above, the coefficients are stored in memory 424 and accessed by FPGA 403 when FPGA 403 applies a filter to a signal. Since, each DART module 400 has two signal paths (transmission and receive) with differing distortions, each signal path has its own set of coefficients stored in memory 424. Thus, when FPGA 403 is processing transmission path signals, FPGA 403 accesses the transmission path filter coefficients and applies a filter having those coefficients to the transmission path signal. Likewise, when FPGA 403 is processing receive path signals, FPGA 403 accesses the receive path filter coefficients and applies a filter having those coefficients to the receive path signal.

In one embodiment, DART module 400 is equalized in the factory after manufacture of DART module 400. Here, a signal generator in the factory inputs signals into DART module 400 and a spectrum analyzer analyzes the output signal. To further analyze the output signal a buffer is used to capture the output signal. A fast Fourier transform (FFT) is then used to convert the output signal to the frequency domain. Once in the frequency domain, the output signal power at each frequency is easily determined.

Once the coefficients for the filter are determined in the factory, the coefficients are stored in memory 424. Memory 424 is separate from FPGA 403, such that the coefficients can be stored in memory 424 without having to integrate the coefficients into FPGA 403. Accordingly, FPGA 403 can be programmed separately, or at a later time as desired with a more generic function. In this way, the filter response can be individualized for each DART module 400 without having to individualize the FPGA programming.

In another embodiment, DART module 400 comprises a self-calibration module 426. Self-calibration module 426 performs the steps listed above to generate test signals and analyze output signals to determine the appropriate filter coefficients for DART module 400. Self-calibration module 426 could be programmed to calibrate DART module 400 at regular intervals, or could be manually initiated when, for example, DART module 400 is tuned to a different frequency band.

FIG. 8 is a flow chart illustrating a method of one embodiment of the present invention for calibrating a signal processing board such as a DART module. The method begins as 810 with setting a compensator within a first signal path of a signal processing board to have a flat response across a first pass band of the signal processing board. The first signal path may include components such as, but not limited to digital-to-analog converters (DACs), analog-to-digital converters (ADCs), SAW filters, and frequency up-converters and down-converters. The method proceeds to 820 with applying a plurality of test signals to an input of the signal processing board, the plurality of test signals spaced in frequency across the first pass band. In one embodiment, the plurality of test signals comprises a plurality frequency sweep signals consisting of a series of sinusoids of equal amplitude spaced evenly across a digital spectrum of the first pass band. The method proceeds to 830 with determining a gain value for each of the plurality of test signals based on an output of the signal processing board. The method proceeds to 840 with estimating a system response function y(n) for the signal processing board based on the gain value for each of the plurality of test signals. In one embodiment, as previously defined in Table 1, amplitude gain values Gm(n) are measured through application of the frequency sweep signal on the physical system. There are K such measurements plus two end points, so n is an index variable from 0 to K+1. Therefore, this frequency sweep can actually take course steps across the channel band. Ge(ω), defined above at Equation (1), represents an estimation of the amplitude response of the system as a function of normalized frequency in units of samples. That is, Ge(ω) is an interpolation of Gm(n) and the corresponding frequencies Fm(n) where Gm(n) was measured. G(m), defined above in Table 2, represents C samples of Ge(ω) taken at each of the C frequencies of the tones contained in the frequency comb test signal x(n). There are C samples, so m is an index that can range from 0 to C-1. The function y(n) is thus the estimated system output that would be produced for an input frequency comb test signal x(n) and an approximation Ge(ω) of the system response. The method proceeds to 850 with solving for coefficients of a vector h(n) based on a difference between a vector d(n) and a convolution h(n)*y(n), wherein d(n) represents an input to the system response function y(n) subject to a delay. It is, in other words, a delayed version of the frequency comb test signal x(n). In one embodiment, the vector h(n) is determined such that the squared error between d(n) and h(n)*y(n) is minimized with respect to h(n).

The method proceeds to 850 with solving for coefficients of a vector h(n) based on a difference between a vector d(n) and a convolution h(n)*y(n), wherein d(n) represents an input to the system response function y(n) subject to a delay. In one embodiment, the difference between the vector d(n) and the convolution h(n)*y(n) is zero. The method proceed to 860 with setting coefficients of a finite impulse response (FIR) filter within the compensator based on the coefficients of the vector h(n).

Although specific embodiments have been illustrated and described herein, it will be appreciated by those of ordinary skill in the art that any arrangement, which is calculated to achieve the same purpose, may be substituted for the specific embodiment shown. This disclosure is intended to cover any adaptations or variations of the present invention. Therefore, it is manifestly intended that this invention be limited only by the claims and the equivalents thereof.

We claim:

1. A signal processing device within a distributed antenna system, the signal processing device comprising:
a signal path within a signal processing board, the signal path having an uncompensated distortion function of G(ω) with a system response represented by y(n); and
a compensator coupled to the signal path, the compensator having a finite impulse response (FIR) filter with an impulse response function represented by H(ω), the compensator having an FIR filter parameter vector $\vec{h}$ determined from an estimated system response y(n) of the signal path to an input comb signal x(n), wherein y(n) is estimated from interpolated measured output responses of the signal path to a plurality of frequency sweep signal test inputs.

2. The signal processing device of claim 1, wherein the FIR filter parameter vector $\vec{h}$ is determined by a calculation based on $$\vec{h}=(\vec{Y}^{H}\vec{Y})^{-1}\vec{Y}^{H}\vec{d}$$

wherein $\vec{Y}$ is a convolution matrix representing channel.

3. The signal processing device of claim 1, further comprising a memory, wherein coefficients for the vector $\vec{h}$ are stored in the memory.

4. The signal processing device of claim 1, wherein the compensator is implemented using a field programmable gate array (FPGA).

5. The signal processing device of claim 1, wherein the signal path of the signal processing board comprises a digital-to-analog converter (DAC) and at least one frequency up-converter.

6. The signal processing device of claim 1, wherein the signal path of the signal processing board comprises an analog-to-digital converter (ADC) and at least one frequency down-converter.

7. The signal processing device of claim 1, further comprising a self-calibration module for calculating coefficients of the FIR filter parameter vector $\vec{h}$ based on a test signal generated by the self-calibration module.

8. The signal processing device of claim 7, wherein the self-calibration module estimates the system response function y(n) for the signal processing board based on the plurality of frequency sweep signal test inputs by solving for coefficients of a vector h(n) based on a difference between a vector d(n) and a convolution h(n)*y(n), wherein d(n) represents an input to the system response function y(n) subject to a delay; and wherein the self-calibration module adjusts the finite impulse response (FIR) filter based on the coefficients of the vector h(n).

9. A method for calibrating a signal processing board, the method comprising:

setting a compensator within a first signal path of a signal processing board to have a flat response across a first pass band of the signal processing board;

applying a plurality of test signals to an input of the signal processing board, the plurality of test signals spaced in frequency across the first pass band;

determining a gain value for each of the plurality of test signals based on an output of the signal processing board;

estimating a system response function y(n) for the signal processing board based on the gain value for each of the plurality of test signals;

solving for coefficients of a vector h(n) based on a difference between a vector d(n) and a convolution h(n)*y(n), wherein d(n) represents an input to the system response function y(n) subject to a delay; and setting coefficients of a finite impulse response (FIR) filter within the compensator based on the coefficients of the vector h(n).

10. The method of claim 9, wherein the vector h(n) is determined such that a squared error between d(n) and the convolution h(n)*y(n) is minimized with respect to h(n).

11. The method of claim 9, wherein the first signal path of the signal processing board comprises a digital-to-analog converter (DAC) and at least one frequency up-converter.

12. The method of claim 9, wherein the first signal path of the signal processing board comprises an analog-to-digital converter (ADC) and at least one frequency down-converter.

13. The method of claim 9, wherein setting coefficients of the finite impulse response (FIR) filter within the compensator based on the coefficients of the vector h(n) further comprises storing the coefficients of the finite impulse response (FIR) filter in a memory.

14. The method of claim 13, wherein the memory is external to the compensator.

15. The method claim 9, wherein applying the plurality of test signals further comprises:

generating the test signals with a self-calibration module located on the signal processing board.

16. The method claim 9, wherein solving for coefficients of a vector h(n) further comprises: determining the coefficients of the vector h(n) with a self-calibration module located on the signal processing board.

17. A signal processing device within a distributed antenna system, the signal processing device comprising:

a signal path within a signal processing board, the signal path having an uncompensated distortion function of G(ω); and a compensator coupled to the signal path, the compensator having a finite impulse response (FIR) filter with an impulse response function represented by a vector $\vec{h}$ and having filter coefficients h(n) of vector $\vec{h}$ that are based on the relationship $\vec{Y}\vec{h}=\vec{d}$, wherein $\vec{d}$ is a vector representing an input to the signal path subject to a delay and $\vec{Y}$ is a convolution matrix for an estimated response of the signal path to a comb signal, the estimated response based on interpolated measured output responses of the signal path to a plurality of frequency sweep signal test inputs.

18. The signal processing device of claim 17, further comprising a memory, wherein the filter coefficients h(n) for the vector $\vec{h}$ are stored in the memory.

19. The signal processing device of claim 17, further comprising a self-calibration module for calculating filter coefficients h(n) for the vector $\vec{h}$ based on frequency sweep signals generated by the self-calibration module.

20. The signal processing device of claim 17, wherein the signal path of the signal processing board comprises at least one of a digital-to-analog converter (DAC) a frequency up-converter, an analog-to-digital converter (ADC) or a frequency down-converter.

* * * * *